United States Patent

[11] 3,584,568

| [72] | Inventor | Leonard P. Hausam<br>Minneapolis, Minn. |
|---|---|---|
| [21] | Appl. No. | 835,159 |
| [22] | Filed | June 20, 1969 |
| [45] | Patented | June 15, 1971 |
| [73] | Assignee | Charter Design and Manufacturing Company<br>Minneapolis, Minn. |

[54] SINGLE UNIT COFFEE MAKER
6 Claims, 4 Drawing Figs.

| [52] | U.S. Cl. | 99/282, 99/305 |
|---|---|---|
| [51] | Int. Cl. | A23f 1/08, A47j 31/047 |
| [50] | Field of Search | 99/281, 282, 283, 304, 305, 306 |

[56] References Cited
UNITED STATES PATENTS

| 3,179,035 | 4/1965 | Lockett | 99/282 |
| 3,371,592 | 3/1968 | Remy | 99/282 |
| 3,443,508 | 5/1969 | Reynolds | 99/282 |

*Primary Examiner*—Marvin A. Champion
*Assistant Examiner*—Robert L. Wolfe
*Attorney*—James R. Cwayna

ABSTRACT: A coffee brewing unit providing a heating tank arranged for holding a quantity of water during heating and including control means for, after heating the water to a predetermined temperature, releasing the same over a measured amount of ground coffee with the releasing means including siphoning means for completely draining the tank with air relief means for draining the flow lines to the spray head and including automatic reset devices to prepare the unit for the next amount of water and the next brewing heating, cycle.

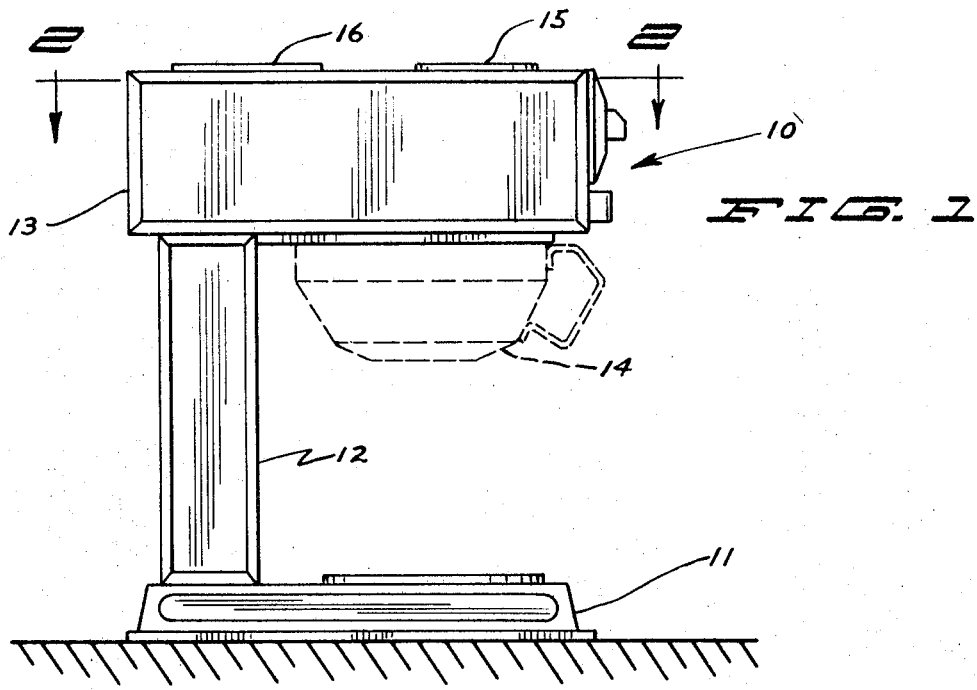
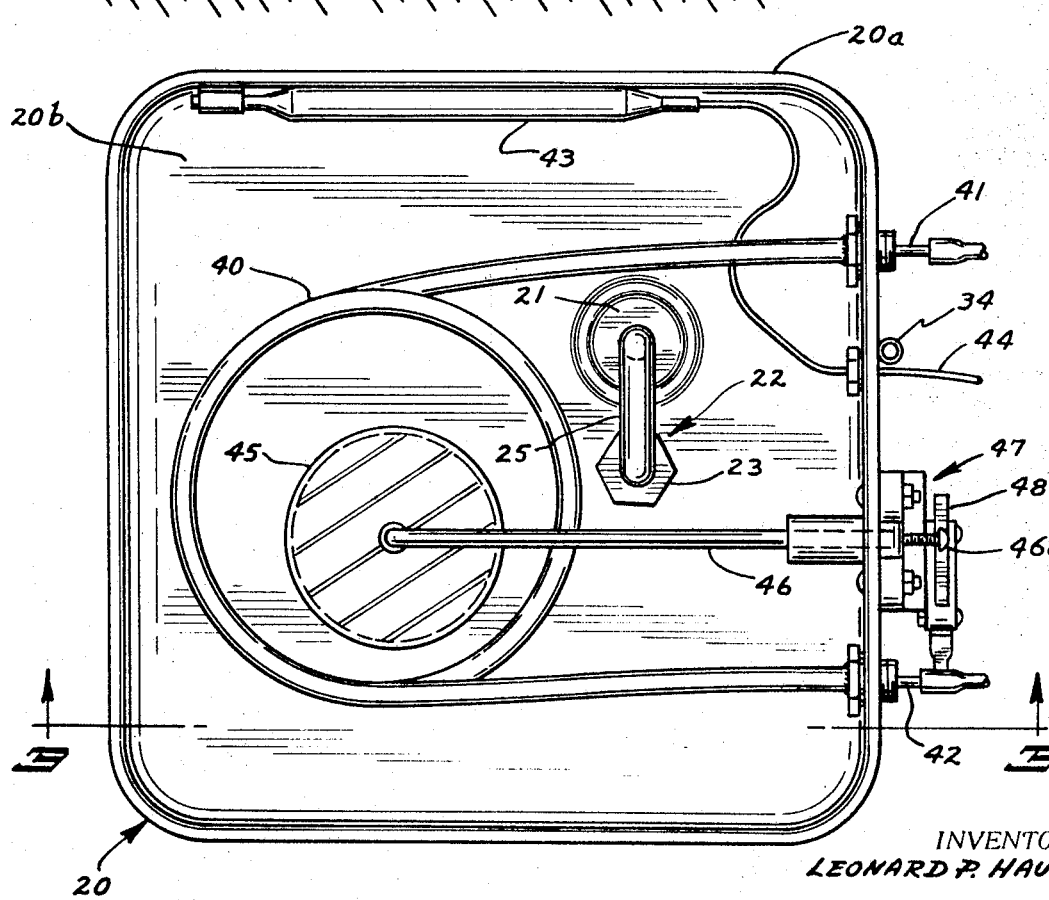

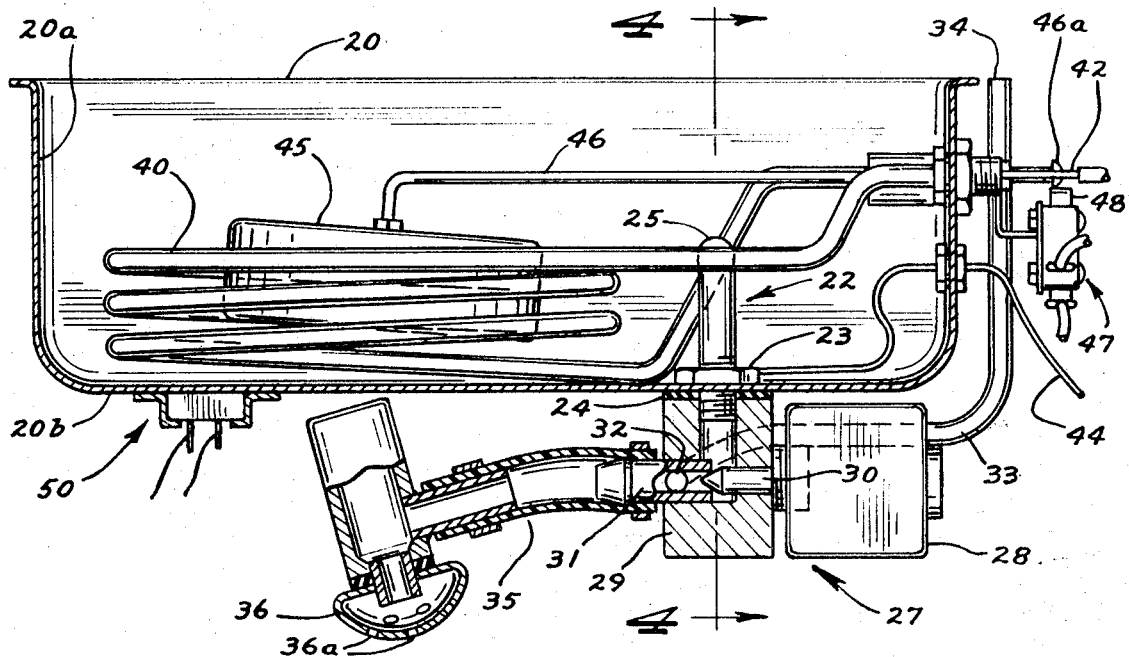
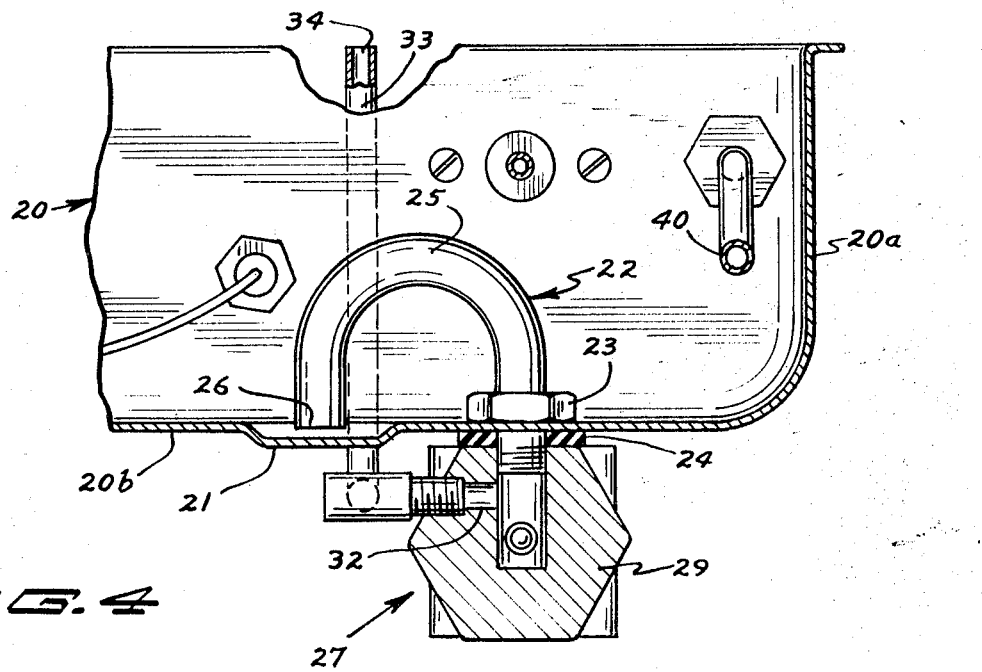

SINGLE UNIT COFFEE MAKER

In the past, various types of coffee brewing and coffee making apparatus have been provided. A new advent into the art has been the utilization of spray head type coffee brewers wherein a predetermined amount of ground coffee is stored in a basket below a hot water discharge head wherein the liquid coffee is brewed by passing the hot water through the ground coffee and wherein various means for premeasuring and controlling the heating of this water has been arranged. Applicant has provided herein, a simple and unique coffee brewing device which includes a means for completely draining the water heating and storage tank after each particular brew is prepared such that the water will not be allowed to stand therein which often results in accumulation of deposits on the side of the brewing tank which will after a period of time, affect the taste of the coffee.

Applicant's device includes a control mechanism for heating an amount of water delivered to the heating tank and upon this water reaching the proper predetermined brewing temperature to release the same over the ground coffee for brewing of liquid coffee with means thereon for controlling this water release and means for insuring that the heating tank has been completely drained and that all lines leading from the tank to the spraying device have been completely drained.

Applicant's device further includes certain preheating control elements to insure that the water has attained a proper temperature, but which prevents the unit from overheating and which further prevents the operation of the unit unless water is available in the heating tank.

It is therefore an object of applicant's invention to provide a coffee brewing device which includes a relatively simple but foul-free control mechanism for heating and delivering water delivered thereto over an amount of ground coffee for the brewing of liquid coffee therefrom.

It is a further object of applicant's invention to provide a coffee brewing device which insures that all of the water delivered thereto for heating and brewing of coffee therefrom will be utilized and delivered from the heating tank such that water will not be free to stand within the tank.

It is a further object of applicant's invention to provide a heating portion for a coffee brewer or the like which includes means for siphoning the water from a heating tank and means for insuring that the tank and the lines extending from the tank are completely drained upon the completion of each individual heating cycle.

It is still a further object of applicant's invention to provide a coffee brewing device including control means associated therewith to insure that the unit will not operate and function unless water has been delivered thereto for heating.

It is still a further object of applicant's invention to provide control mechanisms for the heating tank portions of coffee makers and the like which includes heat control apparatus to prevent the unit from overheating.

These and other objects and advantages of the invention will more fully appear from the following description made in connection with the accompanying drawings, wherein like reference characters refer to the same or similar parts throughout the several views, and in which:

FIG. 1 is a side elevation of a coffee brewing unit embodying applicant's concepts;

FIG. 2 is a horizontal section taken substantially along line 2—2 of FIG. 1;

FIG. 3 is a vertical section taken substantially along line 3—3 of FIG. 2; and,

FIG. 4 is a vertical section taken substantially along line 4—4 of FIG. 3.

In accordance with applicant's drawings, a self-contained coffee brewing unit is illustrated in FIG. 1 and is designated in its entirety 10. This unit includes a base portion 11 upon which a coffee urn or other serving device would be placed, a support section 12 which extends upwardly on the rear portion of the base to an upper housing generally designated 13 which upper housing houses the water heating section for this particular unit.

A ground coffee confining basket is generally designated 14 and is illustrated in position below the housing 13 and above the base 11 such that a predetermined amount of ground coffee may be placed therein and heated water from within the housing 13 may be sprayed or disbursed thereover to properly brew liquid coffee therefrom as the water passes therethrough. A filling cap 15 is provided on the upper surface of the housing 13 and a heater element 16 or the like is illustrated on the upper surface of the housing to facilitate and provide space for more than one urn of liquid coffee.

This coffee brewing technique is well-known in the art and basically the concept includes heating a predetermined amount of water and spraying the same over ground coffee such that upon a single pass of the heated water through the ground coffee will result in proper brewing of liquid coffee. The particular water heating section of applicant's device is illustrated in FIGS. 2, 3 and 4 wherein an open-topped tank 20 is provided, including upstanding sides 20a and a closed bottom 20b, with, as illustrated in FIG. 4, a particularly depressed area 21 formed on a bottom surface 20b of the tank 20 which will serve as an obvious drain and collection point at the bottom of the tank 20 such that the water placed into the tank may be completely drained from the remainder of the bottom surface 20b of the tank 20 to accumulate therein for final removal thereof.

A siphon device generally designated 22 is arranged to extend through the bottom 20b of the tank 20 and is sealed thereagainst for example, with a nut or fastening member 23 on one side thereof with a washer 24 on the other side thereof such that a leakproof seal is provided for the transfer of water from the tank 20 through the siphon device 22. The siphon structure in the form shown includes a tubular member 25 having the open end thereof 26 arranged near the lowermost portion of the depressed area 21 of the base 20b of the bank 20 and obviously, water is not free to flow from the tank until the level of the water within the tank is above the highest extension of the siphon device 25. Obviously, with a siphon type device the flow of water from the tank will be maintained until the open end 26 of the siphon device is broken to air which will only occur after the entire tank has been drained of water. Arranged directly below and receiving relationship to the siphon device 25 is a solenoid valve unit generally designated 27. This solenoid valve unit includes an electrically actuated section 28 and the actual valving portion 29. In the form shown, the plunger 30 of the solenoid valve closes a discharge port 31 of the valve 29 to control the flow of liquid from the tank 20. This particular configuration is illustrated in FIG. 3. Extending upwardly and outwardly from the valve member 29 is an air relief passage 32 which communicates with a vent pipe 33 having an end 34 thereof open to atmosphere. The concept in utilizing this venting and air relief pipe is such that it will be possible to completely drain the discharge opening 31 and the communicating conduit connected thereto of all fluid.

Extending from the discharge nozzle 31 of the valve 29 is a flexible conduit member 35 extending to a spray head device generally designated 36. FIG. 3 does not for clarity reasons illustrate the means for holding the spray nozzle in proper relationship to the housing 13 but it is obvious that the spray nozzle 31 must extend to and be held in position within the lower surface of the housing 13 to direct the heated water from the apertures 36a in the spray head properly over the interior of the ground confining coffee basket 14.

Arranged within the tank 20 are at least a heating coil 40 having electrical contact ends 41—42 extending outwardly through one of the sidewalls of the tank 20, a thermostatic control 43 having a capillary tube 44 extruding through one of the sidewalls of the tank 20 and a float 45 having an actuating arm 46 thereof extending outwardly through the sidewall of the tank 20 to actuate a control switch element generally designated 47, the actuating end of the rod 46 is designated 46a which end 46a is in position to contact the control portion 48 of the control switch 47.

A particular thermostatic control element generally designated 50 is held in captured relation below the bottom surface 20b of the tank 20 and this unit is designed as a master override switch to become activated upon the application of high degrees of heat as will be explained hereinafter.

The operative aspects of the unit in order to provide proper control for disbursing of the water upon reaching the proper temperature, but preventing operation of the unit when no water has been supplied to the unit is basically as follows. The two thermostats 43 and 50 are engaged in series with the control switch 47 such that the unit is always in condition to heat as soon as water is introduced into the tank to the point where the float valve 45 raises to actuate the switch mechanism 47. Upon reaching a predetermined temperature, the water temperature-sensing thermostat 43 activates the solenoid 28 of the valving device 27 for the release of heated water through the spray head 36 for passing over the ground coffee in the ground coffee confining basket 14. The water, of course, has been introduced to the tank 20 above the upper level of the siphon device 25 such that when the valve 29 is opened the siphon action will occur drawing the water from the tank 20 and continuing to draw the water from the tank 20 until the water has been completely drained from all bottom surfaces of the tank, including the depressed area 21. When the water level of the tank has been lowered by such siphon action, of course, the switch 47 will be deactivated and the resulting temperature drop in the tank with a resulting drop in temperature to thermostat 43 will close the solenoid valve 27. Upon closure of the solenoid valve 27 the air relief tube 32 comes into importance. The location of this relief tube permits the water in the connecting conduit 35 and the spray head 36 to drain therefrom. If this air relief tube were not present, then obviously, closure of the plunger 30 of the solenoid valve would result in water being held in the connecting conduits and spray head and would permit the same to drip. This air relief tube then insures that the entire unit is entirely drained after each individual operation.

With the series type connection utilized it is obvious that it is necessary to connect the heating coil 40 into series connection with the switch 47 such that only when the switch 47 is closed will electrical energy be passed onto the coil 40 and naturally, when the water level is dropped to deactivate the switch by lowering of the float 45 then the coil 40 will not be energized.

The safety aspect of the second thermostat 50 is a high limit function such that should the device for some reason overheat, the thermostat will cause an open circuit to prevent further energy from passing to the heating coil 40.

With applicant's concept, it should be obvious that a manual arrangement is provided whereby the user will pour in the amount of water he wishes to brew into liquid coffee and this entire amount of water will be used and will not be allowed to sit in the tank. Obviously, the same situation could be provided with an automatic delivery of water with automatic valving to control the delivery of water to the tank.

The aspect of completely emptying the tank after each usage is particularly important for ease of brewing and for sanitary reasons as any water allowed to stand over a period of time will cause the formation of deposits and the like.

It should be obvious that applicant has provided a new and unique coffee brewing device acting on a suction principle which insures the complete emptying of the tank and associated flow conduits after brewing.

What I claim is:
1. A coffee brewing device including:
   a. a ground coffee confining basket;
   b. a liquid receiving heating tank;
   c. means in said tank for heating liquid delivered thereto;
   d. a discharge conduit having a discharge head communicating with and receiving liquid from said tank to spray the same over said ground coffee; and
   e. valve means arranged in said discharge conduit responsive to said heating means for delivering heated liquid from said tank when said liquid reaches a predetermined temperature.

2. The structure set forth in claim 1 and conduit means having ends respectively communicating with said tank and said valve, said conduit arranged and constructed to siphon said liquid from said tank.

3. The structure set forth in Claim 2 wherein:
   a. the bottom surface of said receiving tank is provided with a liquid accumulation area therein; and,
   b. the end of said conduit communicating with said tank arranged to draw liquid from said accumulation area.

4. The structure set forth in claim 1 and air relief means communicating with said discharge conduit.

5. The structure set forth in claim 1 and float valve means in said tank controlling said heating means.

6. The structure set forth in claim 5 and heat sensing means controlling said heating means to prevent overheating of said device.